United States Patent
Ishiguro et al.

[19]

[11] Patent Number: 5,875,649
[45] Date of Patent: Mar. 2, 1999

[54] ABSORPTION LIQUID SPREADING STRUCTURE FOR INTERIOR OF ABSORPTION CHAMBER IN AIR CONDITIONER

[75] Inventors: Katsusuke Ishiguro; Takehiro Sato, both of Nagoya; Akira Maruyama, Kasugai, all of Japan

[73] Assignee: Paloma Industries, Ltd., Aichi, Japan

[21] Appl. No.: 934,530

[22] Filed: Sep. 22, 1997

[30] Foreign Application Priority Data

Dec. 20, 1996 [JP] Japan .................................. 8-354879

[51] Int. Cl.⁶ .................................................. F25B 15/00
[52] U.S. Cl. ................................. 62/484; 62/494
[58] Field of Search ........................... 62/101, 476, 484, 62/494

[56] References Cited

U.S. PATENT DOCUMENTS

| | | | |
|---|---|---|---|
| 4,048,810 | 9/1977 | Zeilon | 62/101 |
| 4,651,819 | 3/1987 | Yumikura et al. | 165/115 |
| 4,926,659 | 5/1990 | Christensen et al. | 62/476 |
| 5,282,507 | 2/1994 | Tongu et al. | 165/165 |
| 5,351,504 | 10/1994 | Giacometti et al. | 62/476 |
| 5,572,885 | 11/1996 | Erickson | 62/484 |
| 5,729,999 | 3/1998 | Kuhlenschmidt et al. | 62/484 |

FOREIGN PATENT DOCUMENTS 6-21743  3/1994  Japan .......................... F25B 30/04

*Primary Examiner*—William Doerrler
*Attorney, Agent, or Firm*—Robin, Blecker & Daley

[57] ABSTRACT

The absorption chamber of an absorption-type air-conditioning apparatus is formed as a vertically oriented cylinder having an inner surface on which absorption liquid is dispensed for absorbing water vapor or coolant vapor. A guide structure is installed at the inner surface of the cylinder to lead the absorption liquid to the inner surface of the cylinder and to spread the absorption liquid over substantially all of the inner surface of the cylinder. The guide structure may be in the form of a mesh lath rolled into a cylindrical shape and installed against the inner surface of the cylinder or a helical coil installed against the inner surface of the cylinder and having a plurality of grooves formed on an outer surface of the coil to allow a portion of the absorption liquid flowing on an upward-facing surface of the coil to flow vertically downward to portions of the inner surface of the cylinder.

2 Claims, 8 Drawing Sheets

ABSORPTION LIQUID SPREADING STRUCTURE FOR INTERIOR OF ABSORPTION CHAMBER IN AIR CONDITIONER

FIELD OF THE INVENTION

This invention is concerned with absorption-type air conditioners, and is more particularly concerned with the structure of absorption chambers in such air conditioners.

BACKGROUND OF THE INVENTION

In a conventional absorption-type air conditioner, an absorption chamber is formed from a pipe which is installed vertically, and an absorption liquid is provided to flow downwardly from the top of the pipe along an inner surface of the pipe. The absorption liquid absorbs water vapor or coolant vapor contained within the pipe. This arrangement allows the absorption chamber to have a large area for interface between the water vapor or coolant vapor and the absorption liquid, relative to the size of the absorption chamber. Consequently, a relatively compact absorption chamber is possible.

However, in the absorption chamber provided according to conventional practice, the entire inner surface of the pipe is not used effectively because the absorption liquid tends to flow straight down the inner surface of the pipe under the influence of gravity. Further, the absorption liquid flows down the entire length of the pipe in a short period of time and therefore does not effectively absorb the water vapor or coolant vapor. As a result, the conventional absorption chamber structure has a low cooling efficiency. Moreover, the cooling efficiency of the conventional absorption chamber is further reduced by the fact that a large portion of the absorption liquid does not contribute to the absorption of the water vapor or coolant vapor. This is because the rather straight path of flow of the absorption liquid causes little mixing or stirring within the absorption liquid. The water vapor or coolant vapor is absorbed at the surface of the absorption liquid, but the lack of stirring or mixing within the absorption liquid prevents most of the absorption liquid from coming in contact with the water vapor or coolant vapor as the absorption liquid flows downwardly through the pipe. In an attempt to improve the efficiency of this apparatus, it has been proposed to provide a pump to recirculate the absorption liquid back to the top of the pipe. However, this approach tends to make the structure rather complex, and adds requirements for controlling the pump, so that the cost of the apparatus is increased.

OBJECTS AND SUMMARY OF THE INVENTION

It is accordingly an object of the invention to provide an absorption chamber for an air conditioner which overcomes the above-noted disadvantages and which provides increased operating efficiency.

According to an aspect of the invention, there is provided, in an air-conditioning apparatus which has an absorption apparatus including a cylinder in which water vapor or coolant vapor is absorbed into an absorption liquid (wherein the cylinder has a central axis oriented vertically and an inner surface on which the absorption liquid is dispensed for absorbing the water vapor or coolant vapor), an improvement which includes a guiding structure for leading the absorption liquid to the inner surface of the cylinder and for spreading the absorption liquid over substantially all of the inner surface of the cylinder. According to a preferred embodiment of the invention, the guiding structure is in contact with the inner surface of the cylinder and may be formed of a mesh lath rolled into a cylindrical shape and installed against the inner surface of the cylinder. Alternatively, the guiding structure may take the form of a helical coil installed against the inner surface of the cylinder and having a helical upward-facing surface on which the absorption liquid flows helically downward; the coil also having a plurality of grooves formed on an outer periphery of the coil, the grooves being provided to allow a portion of the absorption liquid flowing on the upward-facing surface of the coil to flow vertically downward to portions of the inner surface of the cylinder.

The guiding structure provided in accordance with the invention leads the absorption liquid to flow over substantially the entire inner surface of the cylinder of which the absorption chamber is formed. Consequently, effective use of almost the entire inner surface of the absorption apparatus is achieved. Furthermore, the guiding structure causes the absorption liquid to flow more slowly from the top to the bottom of the absorption chamber, thereby prolonging the period of time within which the absorption liquid stays in contact with the water vapor or coolant vapor to be absorbed. Consequently, the operating efficiency of the apparatus is improved in regard to absorption of the water vapor or coolant vapor.

DESCRIPTION OF PREFERRED EMBODIMENTS

Figure 1:
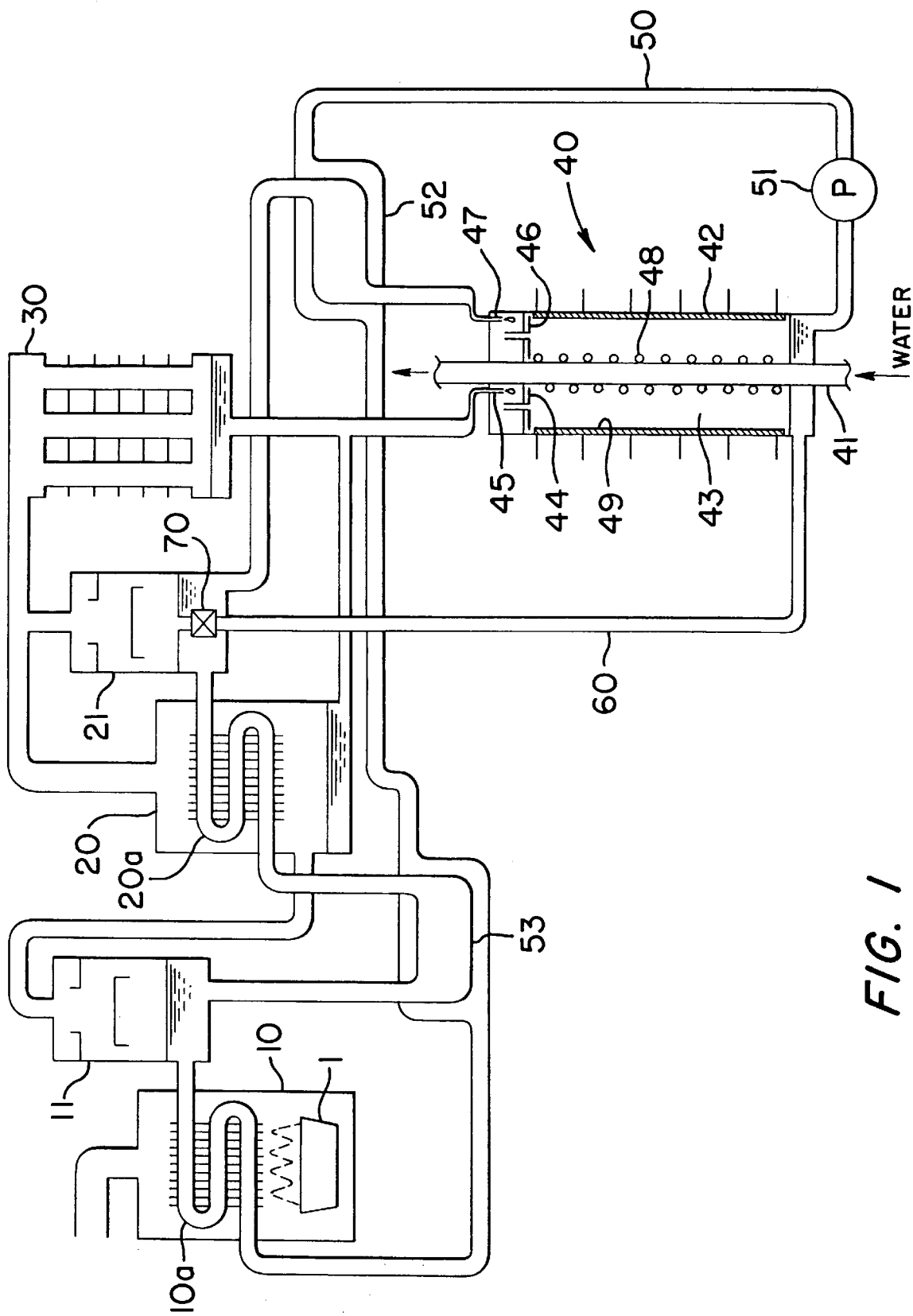
FIG. 1 is a schematic representation of an absorption-type air-conditioning apparatus in which the present invention is applied.

An embodiment of the invention will now be described, initially with reference to FIG. 1. The absorption-type air-conditioning apparatus illustrated in FIG. 1 includes a high temperature regenerator 10, a first phase separator 11, a low temperature regenerator 20, a second phase separator 21, a condenser 30, and a double tube section 40. In the high temperature regenerator 10, a burner 1 heats a low concentration lithium bromide aqua solution (hereinafter referred to as a "low concentration liquid") as the low concentration liquid flows through a fin-tube type heat exchanger 10a. The first phase separator 11 separates the low concentration liquid heated by the high temperature regenerator into steam or coolant vapor and a medium-concentration lithium bromide aqua solution which is hereinafter referred to as the "medium-concentration liquid". The low temperature regenerator 20 re-heats the medium concentration liquid that flows through a fin-tube-type heat exchanger 20a by using steam or coolant vapor produced at the first phase separator 11. The second phase separator 21 separates the medium concentration liquid heated by the low temperature regenerator 20 into steam or coolant vapor and a high concentration lithium bromide aqua solution which will hereinafter be referred as the "high concentration liquid." The condenser 30 cools and liquifies the steam or coolant vapor from the second phase separator 21. The double tube section 40 functions as a combined evaporation and absorption chamber. A fan which is not shown in the drawings directs air to the condenser 30 and the double tube section 40.

The first phase separator 11 is positioned at an elevation higher than the second phase separator 21 to assist the flow of the lithium bromide aqua solution from the first phase separator to the second phase separator. The high and low temperature regenerators 10 and 20 respectively heat the lithium bromide aqua solution which flows in the fin-tube-type heat exchangers 10a and 20a. Consequently, the absorption liquid is heated efficiently and the apparatus quickly becomes ready for use after it is turned on.

The condenser 30 includes a plurality of vertical circular pipes, which have inner surfaces on which vertical and horizontal grooves are formed. These grooves increase the inner surface area of the condenser 30 and improve the efficiency with which the steam or coolant vapor is cooled by the flow of air directed by the fan over the outer surface of the condenser.

Figure 2:
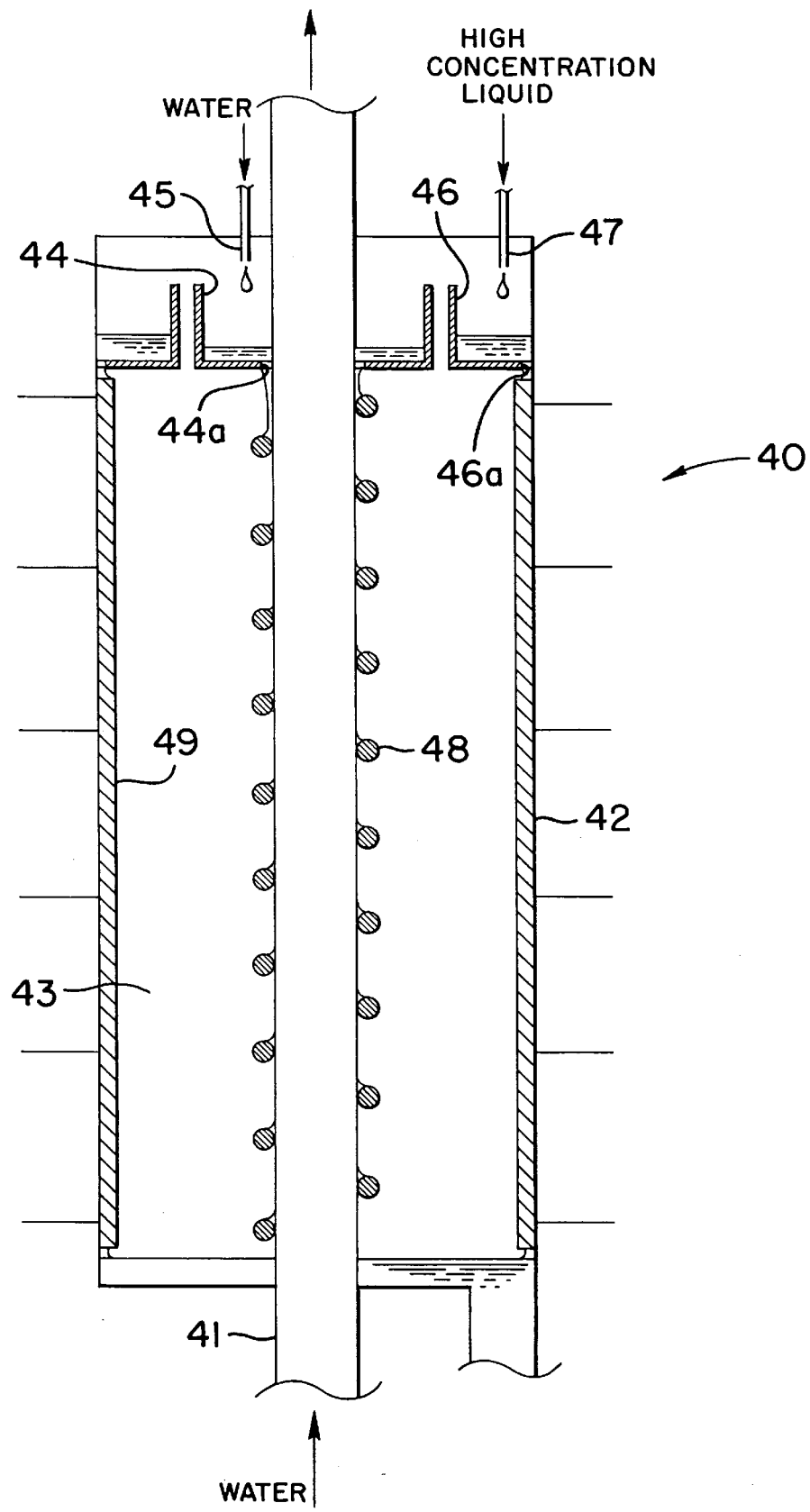
FIG. 2 is a vertical sectional view of a double tube section which forms an evaporation-absorption chamber of the apparatus of FIG. 1.

As shown in more detail in FIG. 2, the double tube section 40 includes a water pipe 41 and an outer pipe 42. A coolant such as water circulates through the water pipe 41 and is supplied to a room unit, which is not shown. The outer pipe 42 is positioned to surround the water pipe 41 to form an evaporation-absorption chamber 43 between the water pipe 41 and the outer pipe 42. A circular reception tray 44 is provided at the outer surface of the water pipe 41 in the evaporation-absorption chamber 43. Water or liquid coolant produced at the condenser 30 and the low temperature regenerator 20 is dripped down to the circular reception tray 44 through dispenser nozzles 45. The water or liquid coolant is then dispensed onto the outer surface of the water pipe 41 through holes 44a provided on the bottom of the circular reception tray 44.

Similarly, a circular reception tray 46 is provided at the inner surface of the outer pipe 42 within the evaporation-absorption chamber 43. The high-concentration absorption liquid produced at the second phase separator 21 is dripped down to the circular reception tray 46 through dispenser nozzles 47. The high-concentration liquid is then dispensed onto the inner surface of the outer pipe 42 through holes 46a provided at the bottom of the circular reception tray 46. The water or liquid coolant dispensed on the outer surface of the water pipe 41 evaporates because low pressure is maintained in the evaporation-absorption chamber 43. The evaporation of the water or coolant removes heat from the water circulating in the water pipe 41 and cools the water in the water pipe 41. The room unit (not shown) performs a cooling operation by using the cooled water circulating in the water pipe 41. The evaporated water or liquid coolant in the evaporation-absorption chamber 43 is immediately absorbed by the high-concentration absorption liquid flowing down the inner surface of the outer pipe 42. The absorption of the water or coolant vapor by the high-concentration liquid releases heat, which is removed by the air flow (generated by the fan which is not shown) over the outer surface of the outer pipe 42.

Figure 3:
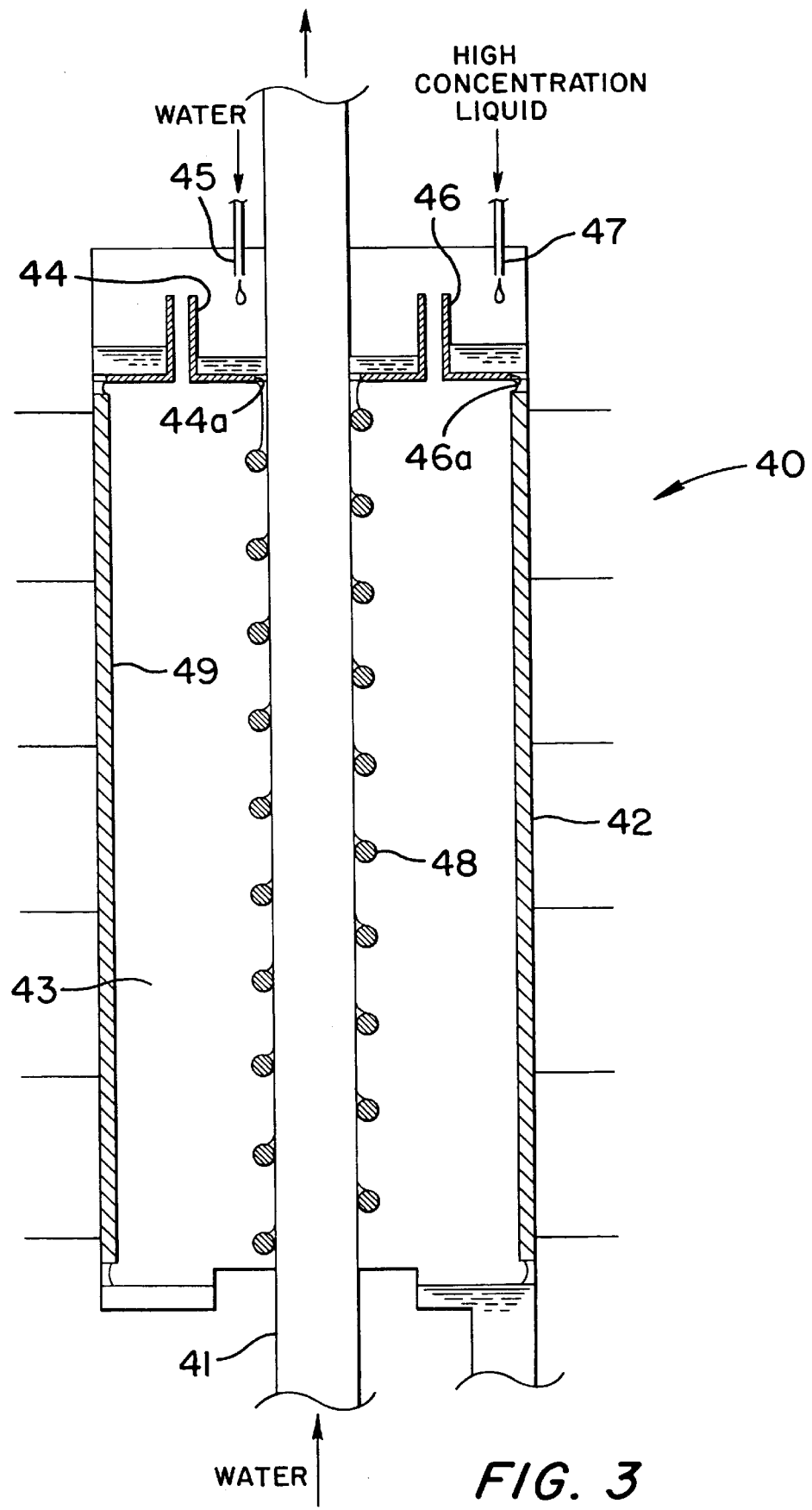
FIG. 3 is a view, similar to FIG. 2, of another example of the evaporation-absorption chamber.

As an alternative to the double tube section 40 shown in FIG. 2, the double tube section may be provided as shown in FIG. 3. According to the example shown in FIG. 3, a circular section of the bottom plate around the water pipe 41 is raised. The raised section of the bottom plate prevents the absorption liquid which is dripping off the inner surface of the outer pipe 42 from coming into contact with the water pipe 41. This improves the cooling efficiency of the water pipe 41.

The water pipe 41 of the evaporation-absorption chamber 43 is preferably formed with grooves that run vertically and horizontally on the entire outer surface of the water pipe 41. The grooves help to bring the water or liquid coolant into contact with the outer surface of the pipe. Consequently, the water or liquid coolant flows rather slowly down to the bottom of the water pipe 41 and spreads more easily over the outer surface of the pipe. In addition, a coil 48 is provided on the outer circumference of the water pipe 41. The coil 48 is in contact with the outer surface of the water pipe 41 and water or liquid coolant flows along the helical path provided by the coil 48. This extends the period of time required for the water or liquid coolant to reach the bottom of the evaporation-absorption chamber, so that a larger proportion of the dispensed water or liquid coolant evaporates in the chamber.

Figure 4:
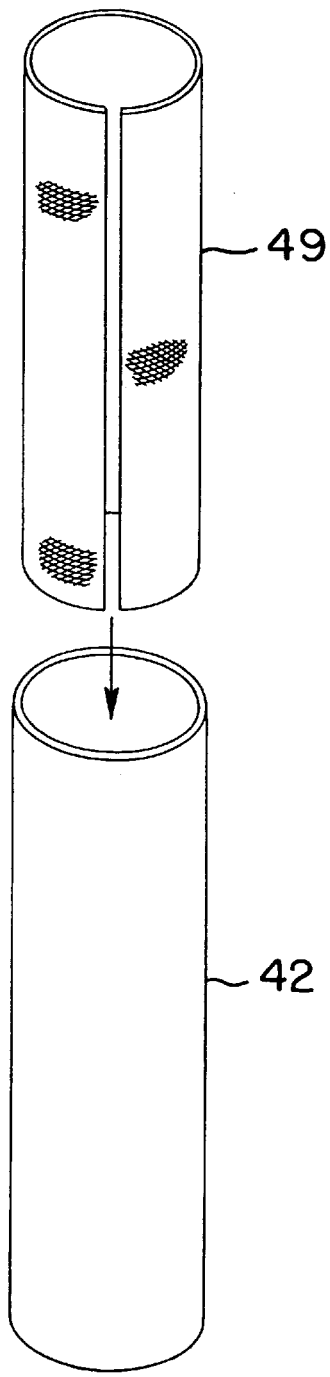
FIG. 4 illustrates how a mesh lath is inserted to serve as an absorption liquid guiding structure in the evaporation-absorption chamber.
Figure 5:
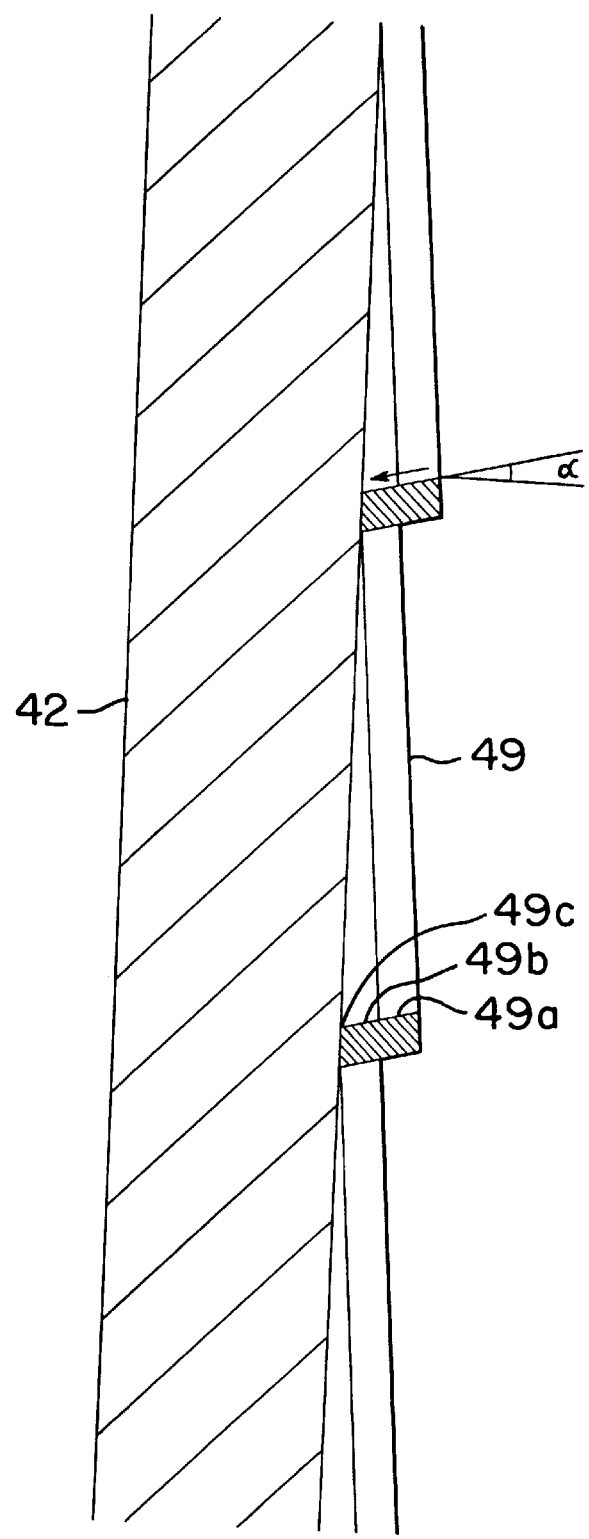
FIG. 5 is a cross-sectional view showing details of the mesh lath of FIG. 4.

The inner surface of the outer pipe 42 is processed so as to be relatively rough, by means of a technique such as an abrasive blasting process. By roughening the surface, the high concentration absorption liquid is permitted to have an improved affinity for the surface. This helps to spread the high concentration liquid over the entire inner surface of the pipe 42. This also lengthens the period of time required for the high concentration liquid to flow down to the bottom of the inner surface of the pipe 42. In addition, as shown in FIG. 4, a mesh lath 49 that has been rolled into the shape of a cylinder is inserted into the outer pipe 42 so as to come into contact with the inner surface of the outer pipe 42. The mesh lath 49 is formed by cutting out segments of sheet metal at an appropriate plurality of locations and then joining ends of the sheet metal. This is a very simple fabrication technique so that the cost of producing this metal lath structure is relatively low. The mesh lath 49 is rolled to form a cylinder with a slightly larger diameter than the inner diameter of the outer pipe 42. Consequently, the mesh cylinder is pressed into a smaller diameter as it is inserted into the outer pipe 42. Once inside, the elasticity of the mesh lath 49 causes the mesh lath 49 to expand and be pressed against the inner surface of the outer pipe 42. As shown in FIG. 5, the grids making up the mesh lath 49 are formed so that the upper ribs of each grid are sloped down in one direction (towards the inner surface of the pipe 42) and the lower end of each upper rib comes into contact with the inner surface of the vertically positioned outer pipe 42.

Figure 6:
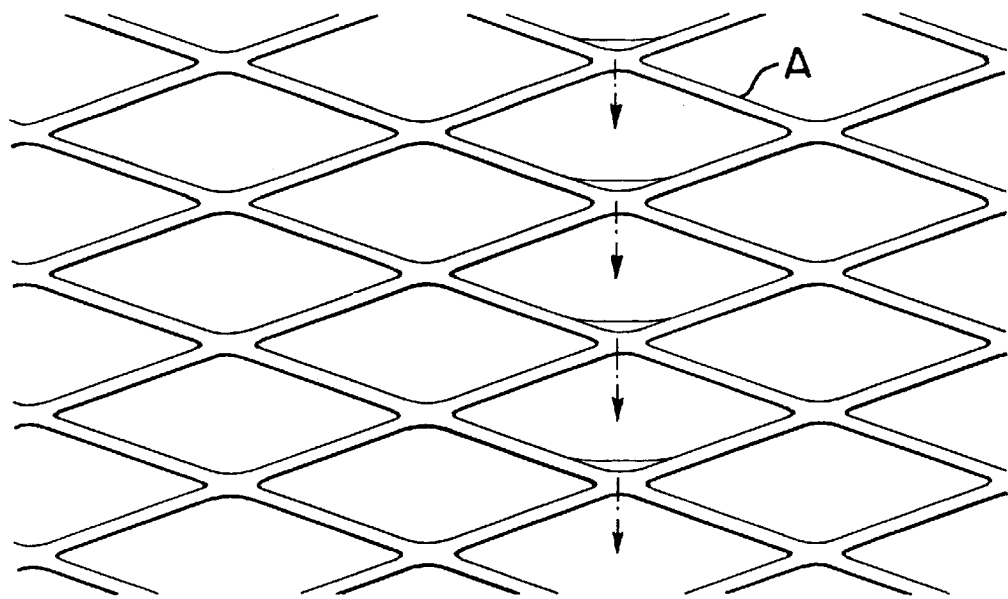
FIG. 6 illustrates a pattern of absorption liquid flow if the guiding structure is made of a metal mesh formed by cutting out grids from a metal sheet.

The benefits provided by the mesh lath 49 will now be explained by comparison with other guiding structures that could be used. For example, FIG. 6 shows a substantially flat metal mesh A fabricated by cutting grids out of sheet metal. The mesh A has a larger area of contact with the inner surface of the outer pipe 42, and the high-concentration absorption liquid dispensed on the inner surface of the outer pipe 42 from the dispenser holes 46a tends to be trapped at the bottom corner of each grid. Therefore a considerable amount of high-concentration liquid remains on the inner surface of the outer pipe 42 and the trapped high-concentration liquid drips down from one grid corner to the next along a surface of the mesh A facing the central axis of the outer pipe 42. As a result, only a portion of the inner surface of the outer pipe 42 is utilized, and the efficiency of the absorption operation is rather low.

Figure 7:
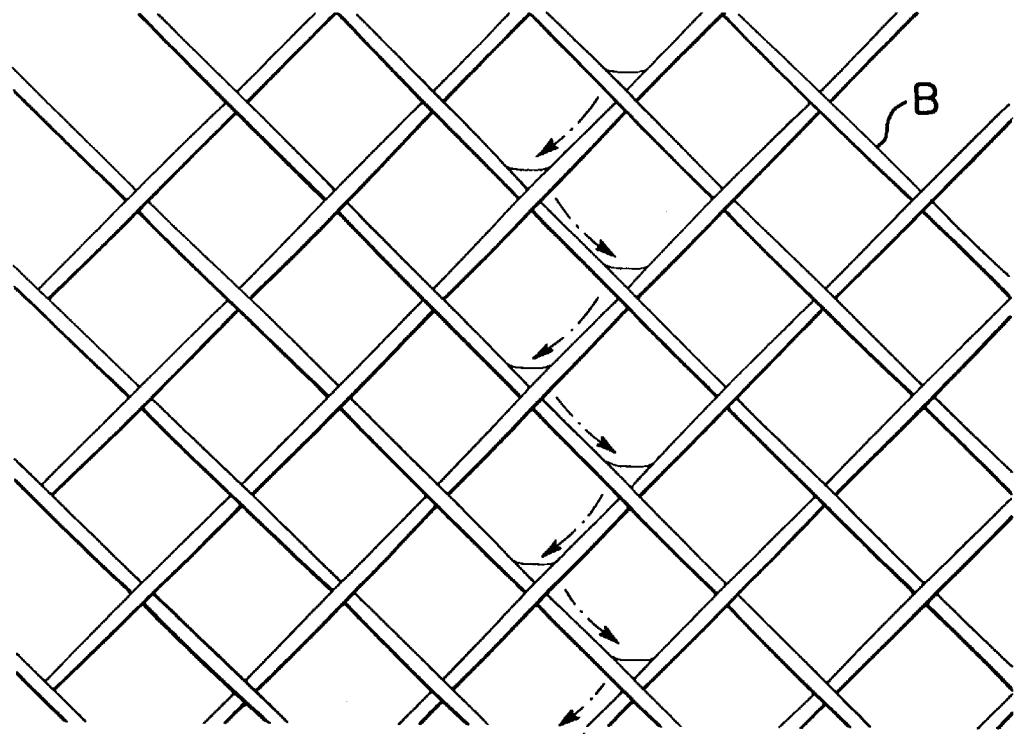
FIG. 7 illustrates a pattern of absorption liquid flow if the guiding structure is formed of a woven wire mesh.

FIG. 7 shows another example of a guiding structure, formed of a woven wire mesh B. Only a small portion of the wire mesh B comes in contact with the inner surface of the outer pipe 42, and therefore a small proportion of the high-concentration liquid stays on the inner surface of the outer pipe 42. The high-concentration liquid trapped at the bottom corner of the wire grid flows downwardly along mesh wires in a zigzag path, so that the high-concentration liquid does not spread over the entire inner surface of the pipe 42.

Figure 8:
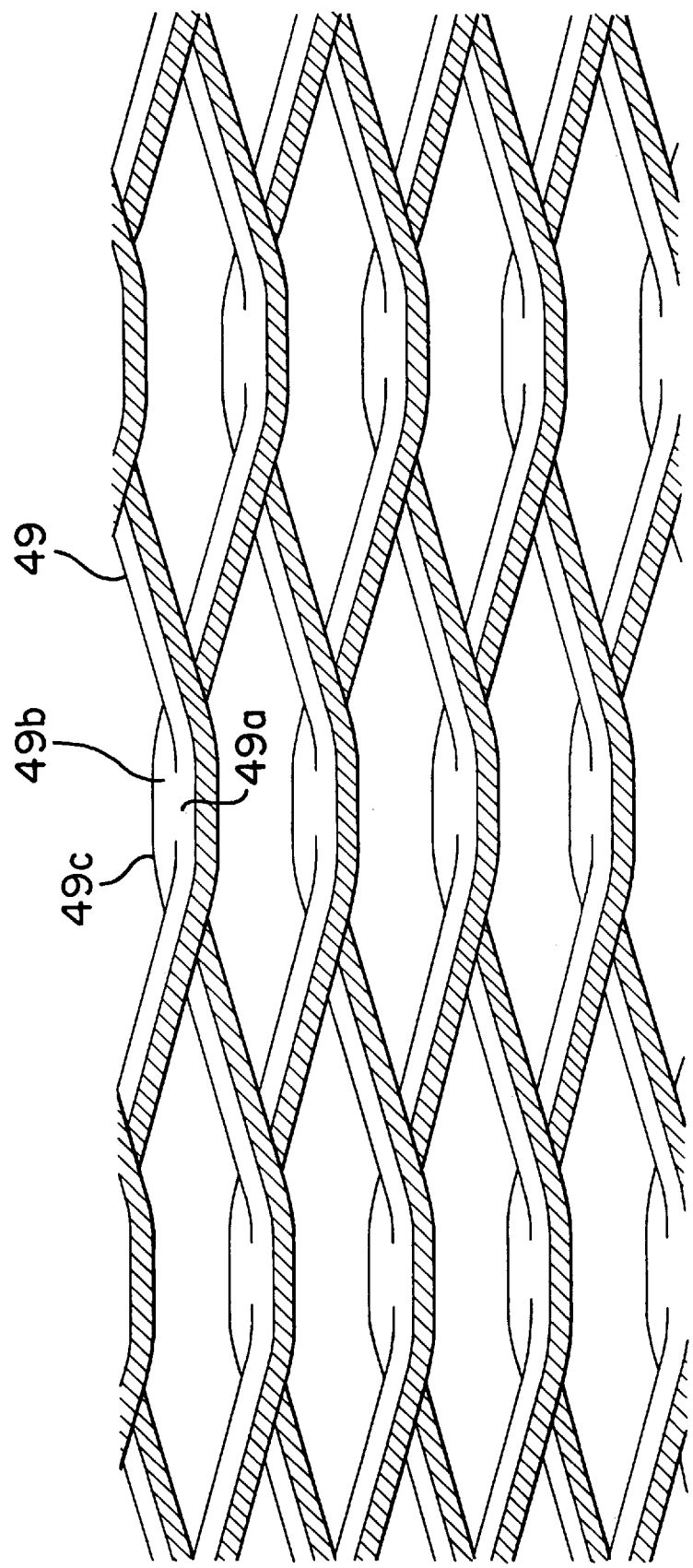
FIG. 8 shows details of the mesh lath used as the absorption liquid guiding structure in a preferred embodiment of the invention.

On the other hand, the flow induced by the preferred mesh lath 49 is shown in FIG. 8. In the mesh lath 49, the upper surface 49a of the bottom corner of each grid, and the upper surface 49b of the top corner of the grid below, are connected and form a flat connection area 49c. Only the flat connection area of the mesh lath 49 is in contact with the inner surface of the outer pipe 42.

Figure 9:
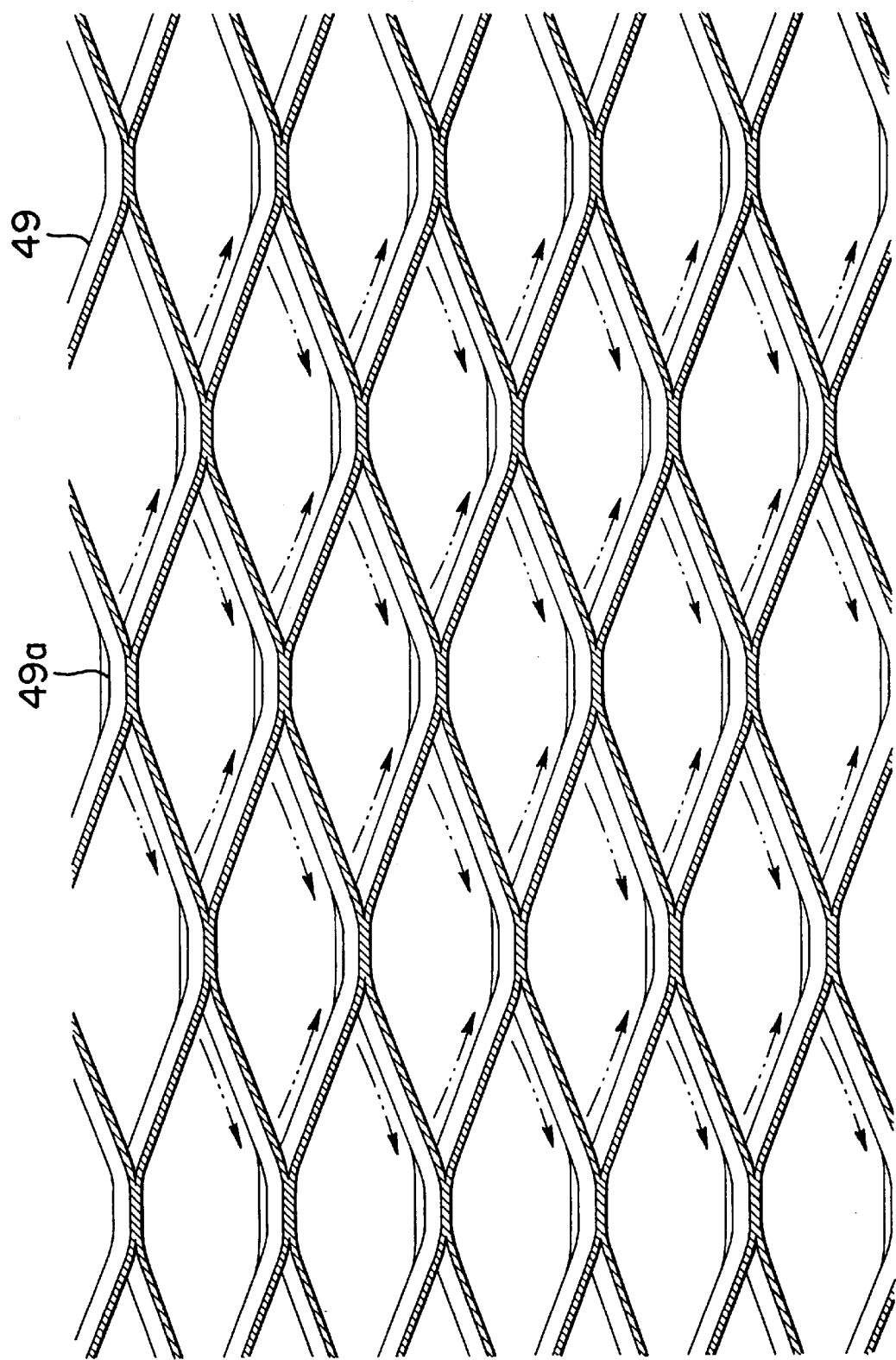
FIG. 9 illustrates a pattern of absorption liquid flow when the mesh lath of FIG. 8 is used.

As shown in FIG. 9, the high-concentration liquid tends to be trapped at the bottom corner 49a of each grid. The trapped high-concentration liquid flows according to a branching pattern from the area of contact with the outer pipe 42 to the upper surfaces of the left and right hand ribs of the grid below. Consequently, the high-concentration liquid spreads out in repeated left and right branches. Also, the upper surface of the ribs of the mesh lath 49 are sloped downward toward other areas that are contact with the outer pipe 42. Thus, as the high-concentration liquid flows along the upper surface of the ribs of the mesh lath 49, the liquid is positioned between the upper surface of the ribs of the mesh lath 49 and the inner surface of the outer pipe 42. Therefore, the high-concentration liquid is less likely to fall from the edge of the upper ribs of the mesh lath 49 which faces the central axis of the outer pipe 42. The heat generated by absorption of water vapor or coolant vapor by the high-concentration liquid is therefore more effectively transferred to the inner surface of the outer pipe 42. In addition, the mesh lath is rather inexpensive to produce.

As an alternative to expansion fitting the mesh lath 49 in the outer pipe 42, the mesh lath 49 can be affixed to the inner surface of the outer pipe 42.

Referring again to FIG. 1, an overflow pipe 60 is provided in association with the second phase separator 21 and provides a passage between the second phase separator 21 and a lower portion of the evaporation-absorption chamber 43. A thermal valve 70 is provided in the overflow pipe 60. The valve 70 closes when its temperature exceeds a certain value. The thermal valve 70 is located within the second phase separator 21 so that there is no interface exposed to the outside of the apparatus. This helps to prevent the lithium bromide aqua solution from leaking from the apparatus.

The apparatus also includes a circulation pump 51 provided on a liquid circulation passage 50 between the evaporation-absorption chamber 43 and the high temperature regenerator 10. The circulation pump 51 circulates low-concentration liquid formed in the evaporation-absorption chamber 43 to the high temperature regenerator 10 via a low temperature heat exchanger 52 and a high temperature heat exchanger 53 which are also provided on the liquid circulation passage 50. The low temperature heat exchanger 52 allows heat to be transferred from the high-concentration liquid produced at the second phase separator 21 to the low-concentration liquid flowing through the passage 50. The high temperature heat exchanger 53 allows heat to be transferred from the medium-concentration liquid produced at the phase separator 11 to the low-concentration liquid flowing through the passage 50.

Operation of the above-described absorption-type air-conditioning apparatus will now be explained. The burner 1 heats the low-concentration liquid which flows through the fin-tube-type heat exchanger 10a of the high temperature regenerator 10 and generates steam or coolant vapor. The first phase separator 11 separates the low-concentration liquid into steam or coolant vapor and medium-concentration liquid. The separated medium-concentration liquid flows to the low temperature regenerator 20 after having its temperature reduced at the high temperature heat exchanger 53. The medium-concentration liquid is then re-heated by the steam or coolant vapor produced at the first phase separator 11 as the medium-concentration liquid flows through the fin-tube-type heat exchanger 20a. The medium-concentration liquid is then separated into steam or coolant vapor and high-concentration liquid at the second phase separator 21. The temperature of the high-concentration liquid is reduced at the low temperature heat exchanger 52, and the high concentration liquid is then dripped onto the circular reception tray 46 via the dispenser nozzles 47. From the tray 46, the high concentration liquid is dispensed onto the inner surface of the outer pipe 42 through the holes 46a provided in the reception tray 46. The mesh lath 49 spreads the high-concentration liquid over substantially the entire inner surface of the outer pipe 42.

Steam or coolant vapor is cooled and condensed in the condenser 30 to form water or liquid coolant as air (driven by a fan which is not shown) flows over the outer surface of the condenser 30. The water or liquid coolant is mixed with water or liquid coolant formed at the low temperature regenerator 20 and then is dripped onto the circular reception tray 44 via dispenser nozzles 45. The water or liquid coolant is then dispensed onto the outer surface of the water pipe 41 via holes 44a provided in the reception tray 44. The water or liquid coolant dispensed onto the outer surface of the water pipe 41 evaporates. The process of evaporation removes heat from the water circulating in the water pipe 41 and cools the water in the pipe 41. The room unit (not shown) performs a cooling operation using the cooled water circulating in the water pipe 41. The water vapor or coolant vapor formed in the evaporation-absorption chamber 43 is immediately absorbed by the high-concentration absorption liquid dispensed on the inner surface of the outer pipe 42. While absorbing the water vapor or coolant vapor, the high-concentration liquid on the inner surface of the outer pipe 42 releases heat. The released heat is removed by air circulated over the outer surface of the pipe 42 by the fan which is not shown. After absorbing the water vapor or coolant vapor, the high-concentration liquid becomes a low-concentration liquid. The circulation pump 51 circulates the low-concentration liquid back to the high temperature regenerator 10 by way of the low temperature heat exchanger 52 and the high temperature heat exchanger 53. The low-concentration liquid is successively heated as it passes through the low temperature heat exchanger 52, the high temperature heat exchanger 53, and the high temperature regenerator 10.

The absorption-type air-conditioning apparatus provided in accordance with the invention has the following advantages. The mesh lath cylinder provided against the inner surface of the outer pipe 42 repeatedly traps the high-concentration liquid at the bottom corners of the mesh lath as the liquid flows downwardly. This extends the period of time required for the liquid to reach the bottom of the outer pipe 42, so that the liquid has more time to interact with the water vapor or coolant vapor, and therefore can effectively absorb the water vapor or coolant vapor. It is accordingly not necessary to provide a pump or other structure to recirculate the high-concentration liquid from the bottom to the top of the absorption chamber. This reduces the cost of manufacturing the apparatus.

Also, the mesh lath causes the absorption liquid to flow in a repeatedly branching pattern along the ribs of the grids of the mesh lath as the liquid flows downward. This effectively utilizes substantially the entire inner surface of the outer pipe 42. It also increases the area of contact between the water vapor or coolant vapor and the absorption liquid so that the efficiency of the absorption operation is improved.

In addition, by repeatedly trapping the absorption liquid as it flows downwardly, the absorption liquid is thoroughly mixed. This avoids the situation in which only a small fraction of the absorption liquid is exposed to the water vapor or coolant vapor, and in which a large part of the high-concentration liquid would reach the bottom of the absorption chamber without absorbing water vapor or coolant vapor and without turning into the low-concentration liquid.

In addition, the cost of fabricating the mesh lath 49 is low, so that the cost of producing the apparatus is minimized.

The combination of evaporation and absorption chambers into a single evaporation-absorption chamber formed between the water pipe 41 and the outer pipe 42 also helps to simplify the structure of the apparatus. The size, weight and manufacturing cost of the apparatus are reduced. Also, the water vapor or coolant vapor is absorbed efficiently by the high-concentration absorption liquid because evaporation and absorption occur via surfaces that face each other in the evaporation-absorption chamber 43. In addition, cooling is performed over the entire circumference of the water pipe 41, which promotes efficiency of the apparatus.

Because the air-conditioning apparatus described herein uses fin-tube-type heat exchangers 10a and 20a in the high and low temperature regenerators 10 and 20, only a rather small amount of lithium bromide aqua solution is required. Therefore, the solution can be warmed up quickly, and the apparatus commences operation quickly. Also, the overall weight of the apparatus is reduced.

Further, the fin-tube-type heat exchangers permit the absorption liquid to be heated efficiently. The respective fin-tube-type heat exchangers 10a and 20a (of the high and low temperature regenerators 10 and 20, respectively) are formed with identical structures so that the apparatus can be produced economically. The first and second phase separators 11 and 21 are also formed with identical structures to reduce the cost of the apparatus.

Figure 10:
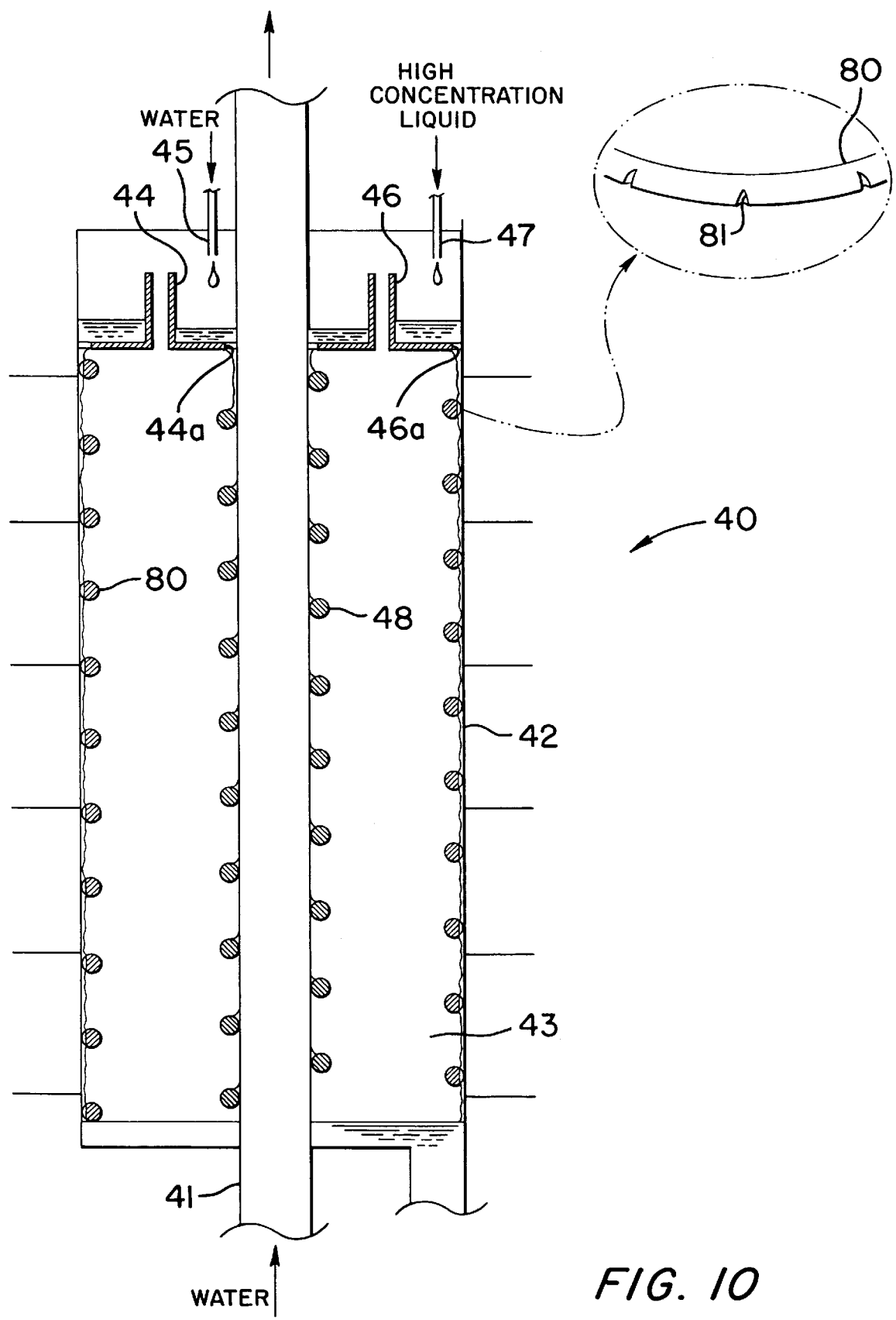
FIG. 10 is a view, similar to FIG. 2, of an alternative embodiment of the invention in which a helical coil is used as the absorption liquid guiding structure.

Up to this point, an embodiment of the invention has been described in which a mesh lath 49 is installed against the inner surface of the outer pipe 42 as structure for guiding the high-concentration absorption liquid to the inner surface of the pipe 42. However, there will now be described another embodiment of the invention, illustrated in FIG. 10, in which an alternative structure is provided for guiding the high-concentration liquid to the inner surface of the pipe 42. According to the embodiment shown in FIG. 10, a helical coil 80 is installed against the inner surface of the outer pipe 42. A plurality of vertically extending grooves 81 are formed at the outer periphery of the coil 80 at points where the coil 80 comes in contact with the inner surface of the outer pipe 42. A part of the absorption liquid flowing along the upper helical surface of the coil 80 flows vertically downward through the grooves 81 and is transferred to and flows down along the inner surface of the outer pipe 42. As a result, part of the high-concentration absorption liquid dispensed from the tray 46 flows along the helical path provided on the upper surface of the coil 80 and adjacent to the inner surface of the outer pipe 42, while another portion of the absorption liquid flows downwardly through the grooves 81 and reaches the bottom of the outer pipe 42. The helical path imparted to the high concentration liquid extends the period of time required for the liquid to flow to the bottom of the evaporation-absorption chamber. At the same time, the part of the high concentration liquid flowing down through the grooves 81 makes effective use of the area of the inner surface of the pipe 42 which does not touch the coil 80. This means that relatively few turns may be provided in the coil 80, and the cost of making the coil is reduced.

Although the invention is described above as being applied in an apparatus which performs only cooling, it is also contemplated to apply the present invention in an apparatus which performs both cooling and heating operations, by switching the water or liquid coolant and the absorption liquid between the nozzles 45 and 47.

In addition, although the invention has been illustrated in connection with a combined evaporationabsorption chamber, it is also contemplated to apply the invention in any absorption chamber in which an absorption liquid is dispensed onto the inner surface of a vertically installed cylinder in order to absorb water vapor or coolant vapor present in the cylinder.

Also, coolants other than water and absorption media other than lithium bromide may be used.

Various changes in the foregoing embodiments may be introduced without departing from the invention. The particularly preferred embodiments are thus intended in an illustrative and not limiting sense. The true spirit and scope of the invention are set forth in the following claims.

What is claimed is:

1. In an air-conditioning apparatus which has an absorption apparatus including a cylinder in which water vapor or coolant vapor is absorbed into an absorption liquid, the cylinder having a central axis oriented vertically and an inner surface on which said absorption liquid is dispensed for absorbing the water vapor or coolant vapor, the improvement comprising:

guiding means for leading said absorption liquid to said inner surface of said cylinder and for spreading said absorption liquid over substantially all of said inner surface of said cylinder;

said guiding means being in contact with said inner surface of said cylinder and including a mesh lath rolled into a cylindrical shape and installed against said inner surface of said cylinder;

said mesh lath being formed by cutting diamond-shaped segments from a metal sheet.

2. In an air-conditioning apparatus which has an absorption apparatus including a cylinder in which water vapor or coolant vapor is absorbed into an absorption liquid, the cylinder having a central axis oriented vertically and an inner surface on which said absorption liquid is dispensed for absorbing the water vapor or coolant vapor, the improvement comprising:

guiding means for leading said absorption liquid to said inner surface of said cylinder and for spreading said absorption liquid over substantially all of said inner surface of said cylinder;

said guiding means being in contact with said inner surface of said cylinder and including a mesh lath rolled into a cylindrical shape and installed against said inner surface of said cylinder;

said mesh lath being installed in said cylinder by expansion fitting.

* * * * *

UNITED STATES PATENT AND TRADEMARK OFFICE
CERTIFICATE OF CORRECTION

PATENT NO. : 5,875,649
DATED : March 2, 1999
INVENTOR(S) : Katsusuke Ishiguro, et al.

It is certified that error appears in the above-identified patent and that said Letters Patent are hereby corrected as shown below:

Col. 8, line 29, delete "evaporationabsorption" and insert --evaporation-absorption--.

Signed and Sealed this

Twenty-eighth Day of December, 1999

Attest:

Q. TODD DICKINSON

Attesting Officer

Acting Commissioner of Patents and Trademarks